INVENTOR.
John C. Priscu

June 30, 1970   J. C. PRISCU   3,517,890
DISK SHEAR

Filed July 11, 1967   6 Sheets-Sheet 2

INVENTOR.
John C. Priscu
BY
HIS ATTORNEYS

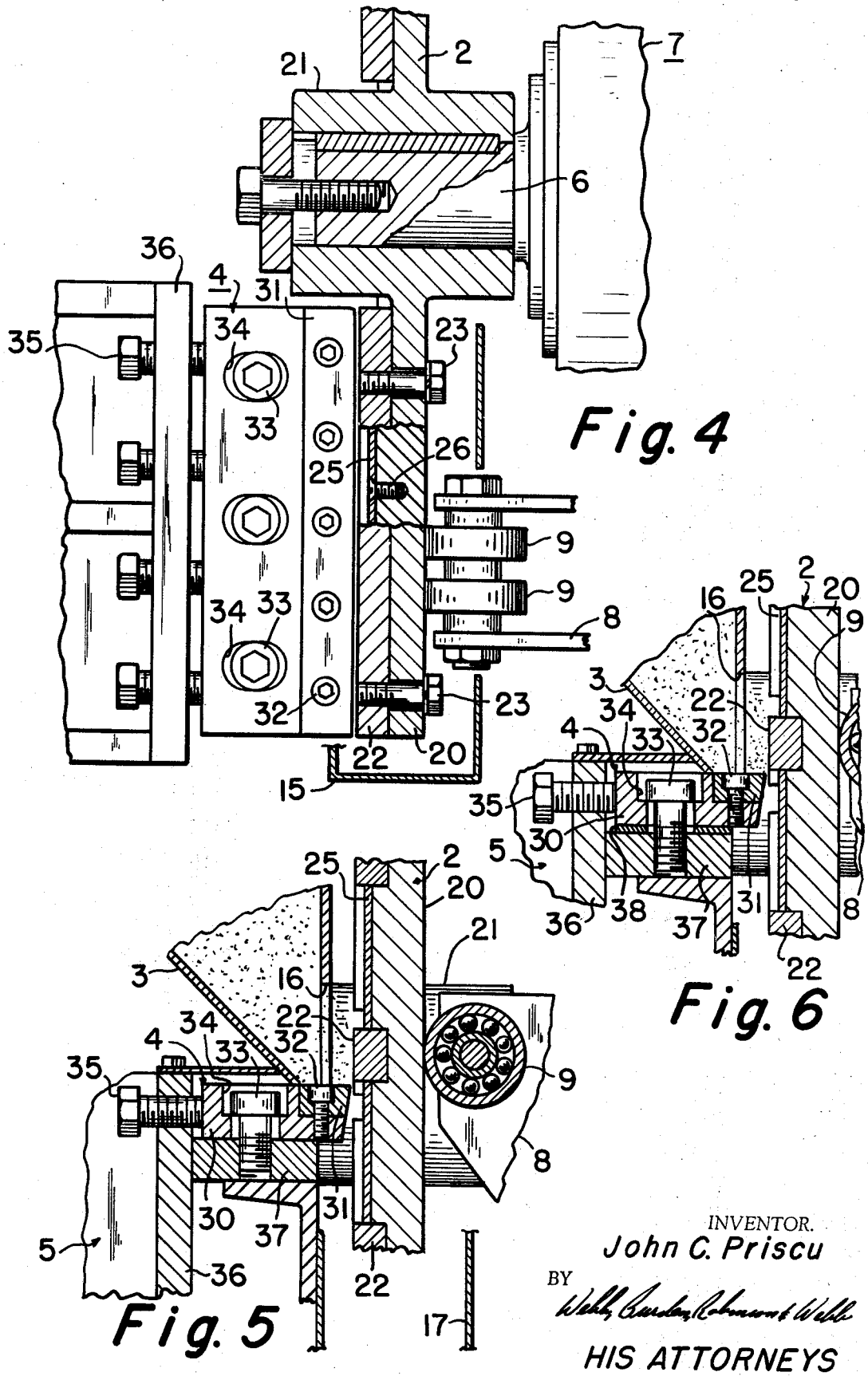

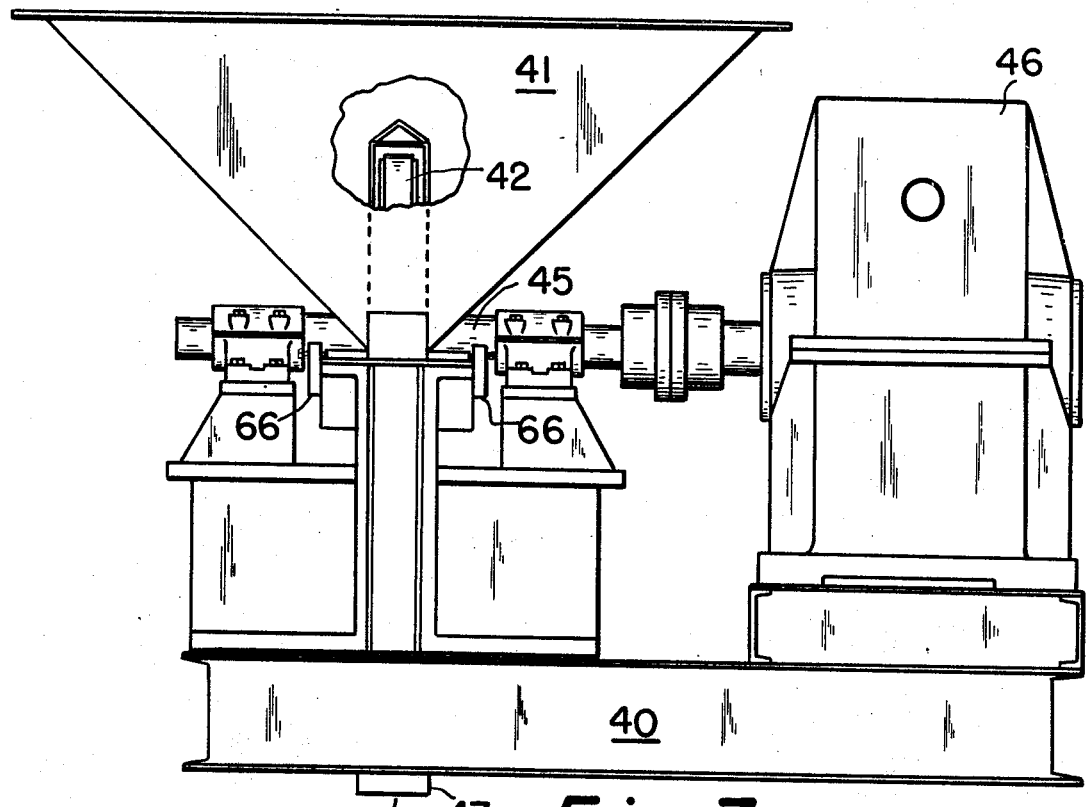
Fig. 7
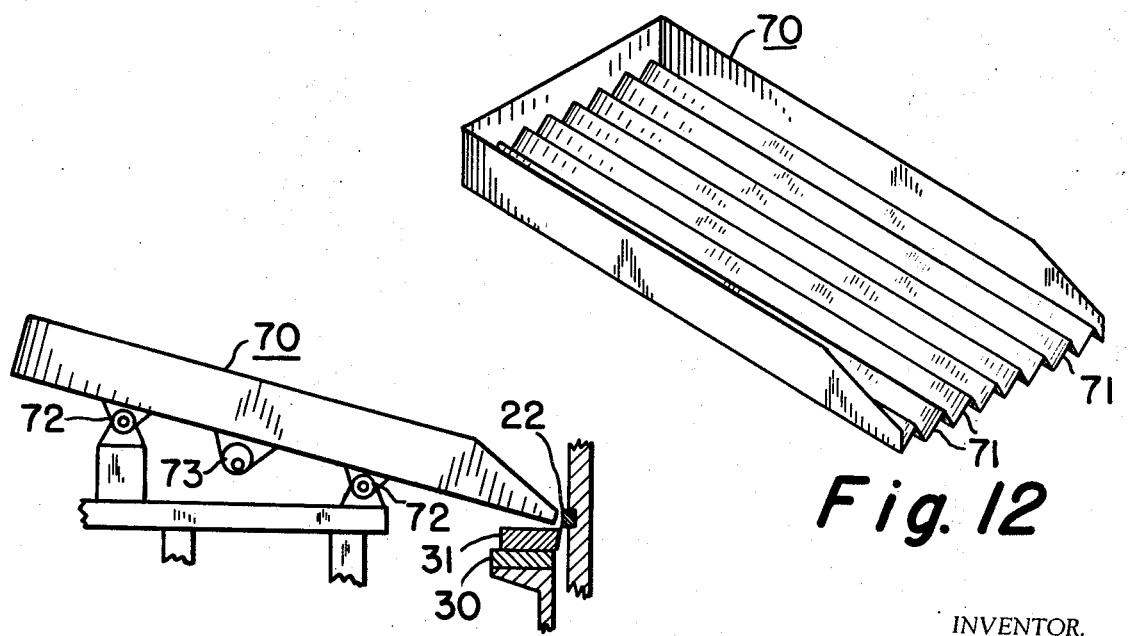
Fig. 12
Fig. 13
INVENTOR.
John C. Priscu
HIS ATTORNEYS

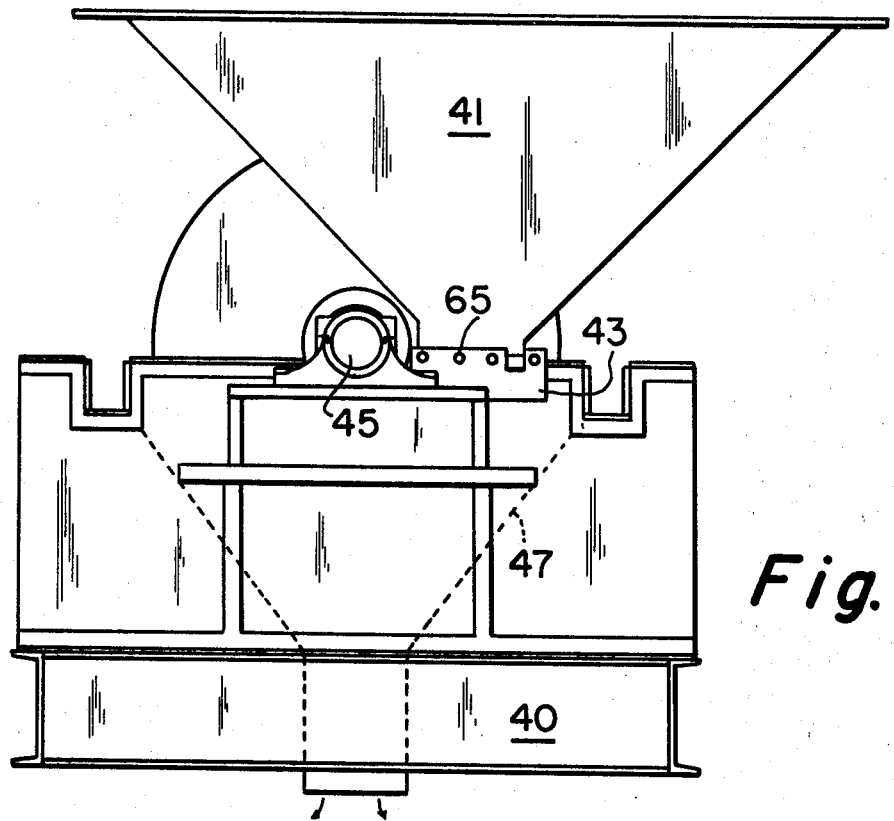
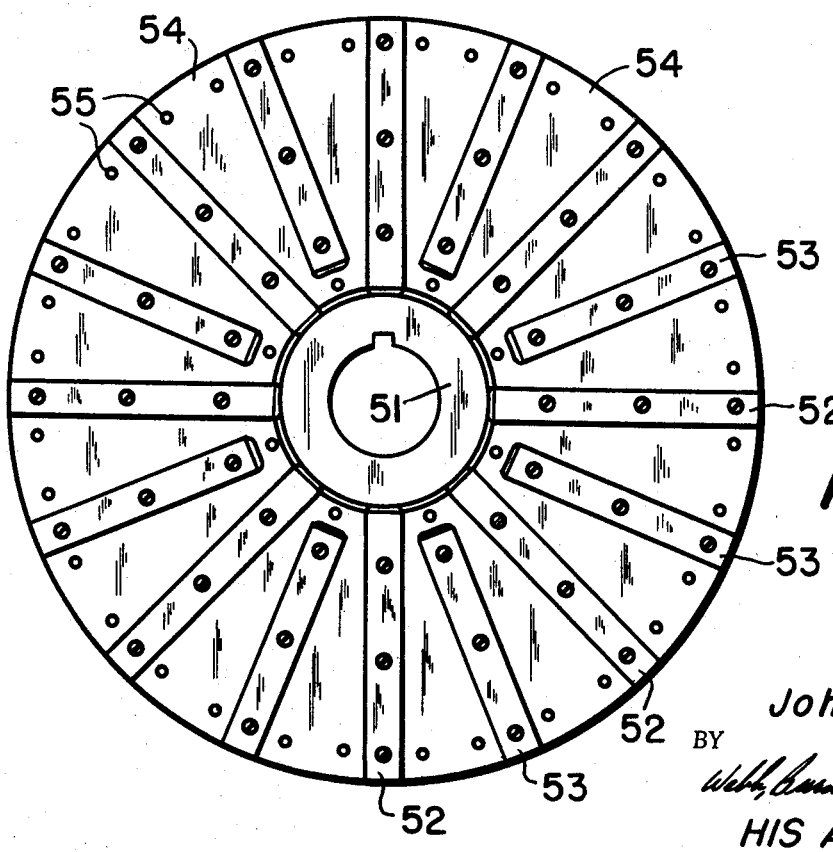

INVENTOR.
John C. Priscu
BY
HIS ATTORNEYS

United States Patent Office 3,517,890
Patented June 30, 1970

3,517,890
DISK SHEAR
John C. Priscu, 918 E. Essex St.,
Las Vegas, Nev. 89107
Filed July 11, 1967, Ser. No. 652,491
Int. Cl. B02c *18/06*
U.S. Cl. 241—141
8 Claims

ABSTRACT OF THE DISCLOSURE

A shear having rotating and stationary shear members and a material feed hooper for supplying material to be sheared to the shear members. The rotary shear member comprises a vertical disk having a plurality of radial cutting blades on its cutting face and spacing segments removably attached to the cutting face between the blades to define the distance between the cutting edge and the base of each blade and thereby determine the maximum size of the sheared material.

---

Figure 1:
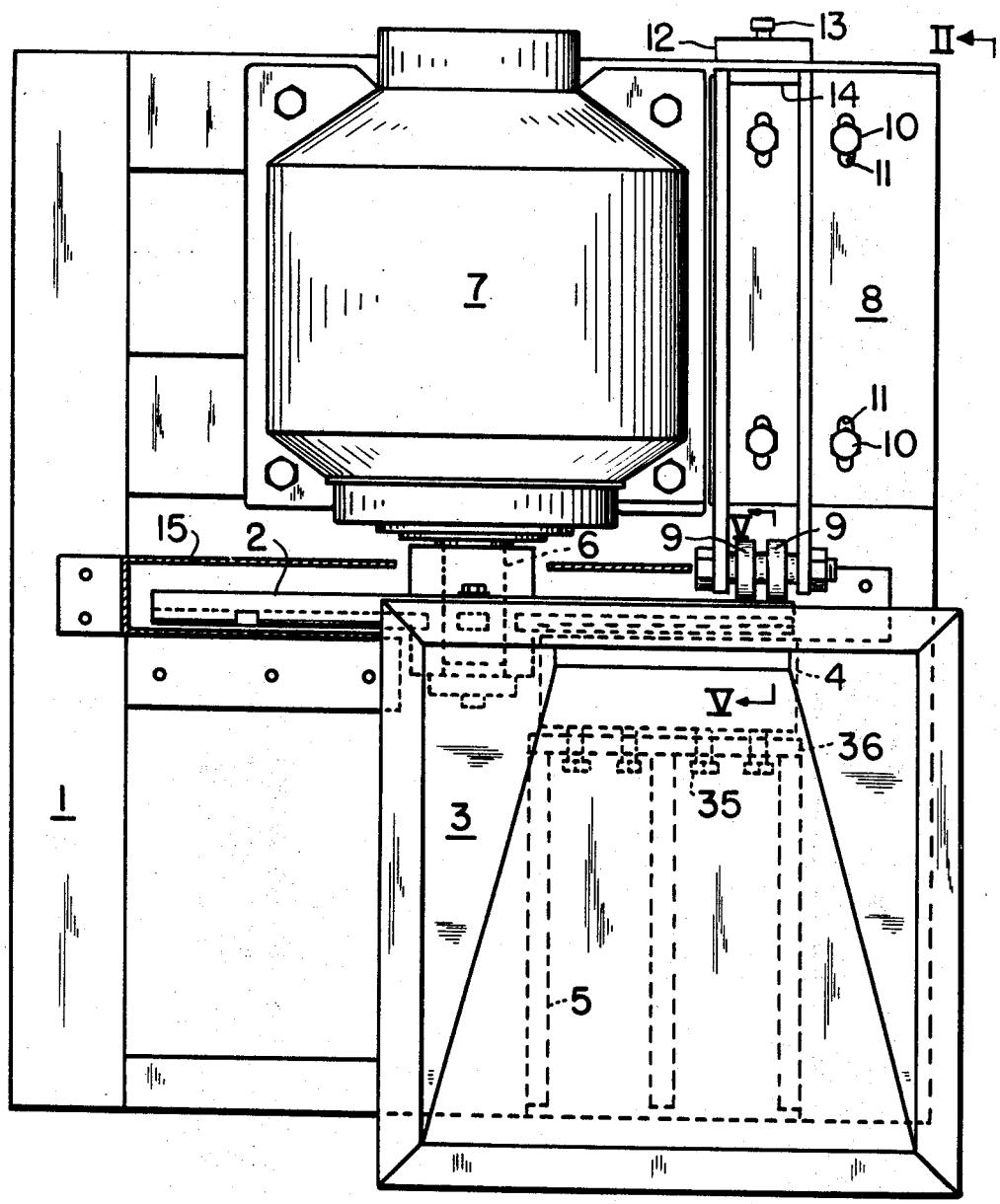

This invention relates to shears and more particularly to rotary disk shears for reducing the size of pieces of metal sponge and scrap metal.

The production of various metals such as, for example, titanium, zirconium and uranium from the reduction of their oxides produces a sponge-like mass of the metal which will vary in size and form in accordance with the technique used to remove it from the reduction apparatus. Regardless of its form, the pieces of metal sponge must generally be reduced in size so that further processing steps may be carried out thereon. The sponge-like metal resulting from oxide reduction is often contaminated with the chemicals used in reducing the oxide, and it is necessary to remove contaminants from the metal. The removal of contaminants is accomplished by distillation, leaching or other methods of chemical extraction; and it is desirable to reduce the size of the pieces of metal sponge while maintaining the porosity thereof to facilitate this operation. Additionally, it is necessary to reduce the size of the pieces of metal sponge for testing to determine metal quality and for blending with alloying agents. After the contaminants have been removed and the desired alloying agents added, the metal is compacted into electrodes for arc melting into ingots.

In the past metal sponge has been reduced in size by crushers and hammer mills. Reduction in crushers and hammer mills is accomplished by the application of force to the metal, and the metal is compacted which makes it difficult to remove contaminating material and difficult to compact the metal pieces into electrodes for subsequent arc melting. Additionally, metal sponge is difficult to process in crushers and hammer mills since it is relatively ductile having no specific cleavage lines and is not friable. In order to reduce the size of the metal pieces without compaction and to maintain the desired porosity for subsequent decontamination and compaction into electrodes, it has been found advantageous to subject the metal sponge to a shearing action rather than to a crushing or impacting.

An advantageous piece size for processing and for compaction into electrodes is less than one-half inch mesh and pieces should preferably be elongated. However, pieces somewhat smaller than one-half inch mesh may be desirable under certain circumstances; and for this reason, it is necessary to provide the shears with means for varying the size of the sheared material. The disk shear of my invention may be used in conjunction with other shears to effect the final size reduction after the material has been reduced by the other shears.

The shear disclosed herein is extremely effective in sizing small pieces of material of approximately one inch in overall cross section and less. Shearing material of this size requires relatively little force but requires a great many individual cuts since a large quantity of material must pass through the shear. For this reason, it is important to provide a large number of cutting edges spaced as close together as possible within the limits of feed practicality. However, the spacing must not be less than the maximum size of the pieces to be cut by the shear.

The disk shear of my invention may be used to process uncontaminated sponge and contaminated sponge having the pores or voids filled with hardened salts of the metal used in the reduction process. Additionally, the shear may be used to reduce the size of scrap metal so that the metal can be included in electrodes.

Figure 2:
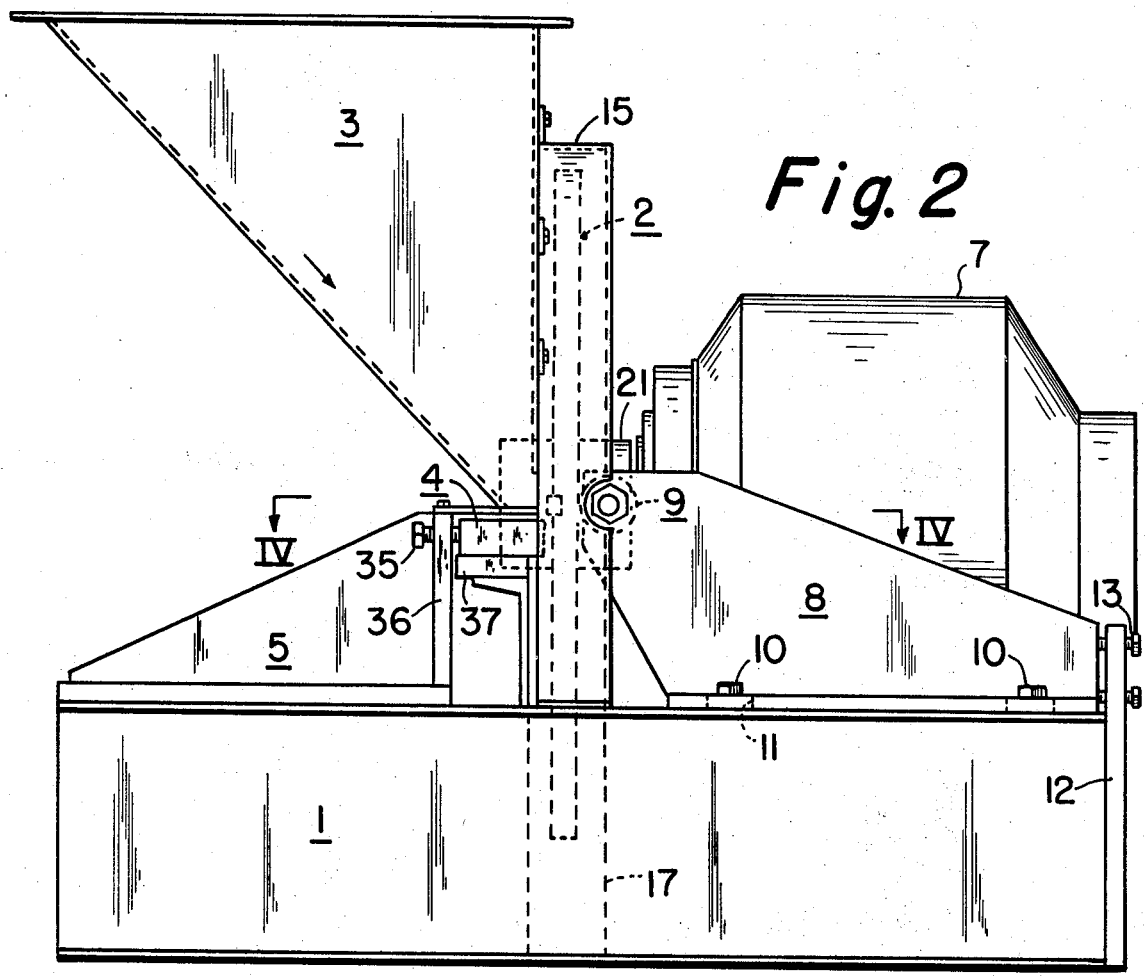
Figure 3:
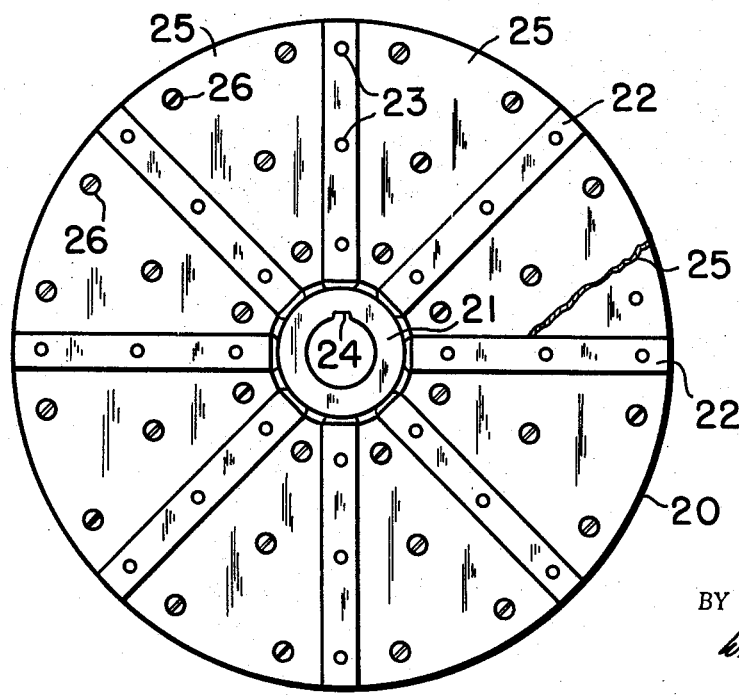
Figure 10:
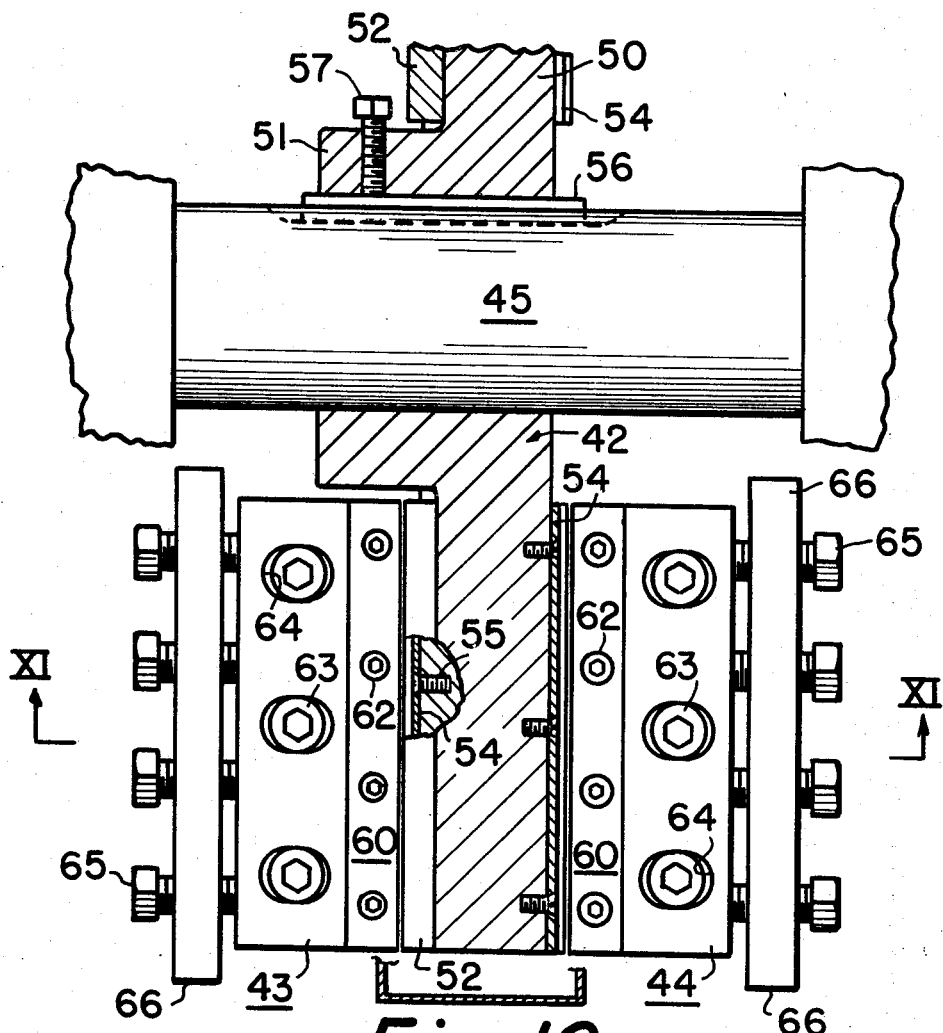
Figure 11:
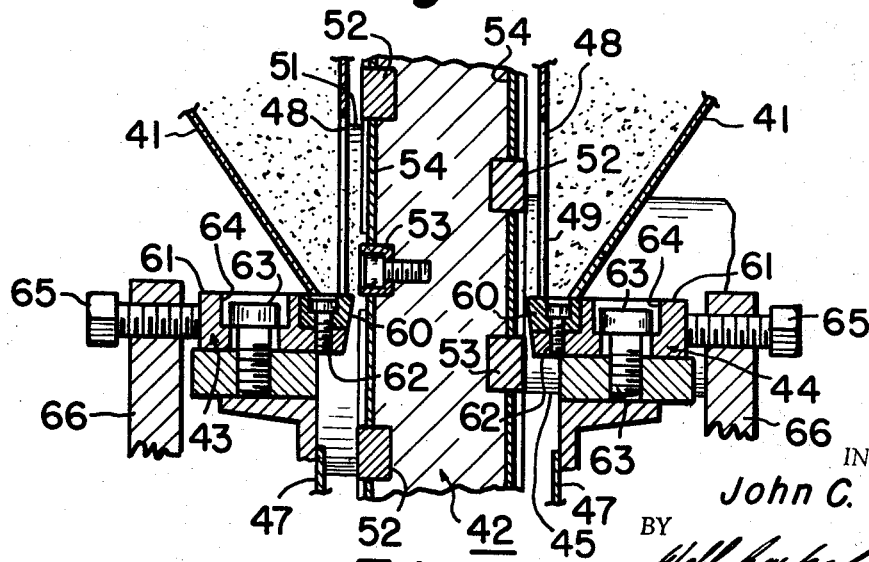

In the accompanying drawings, I have shown preferred embodiments of my invention in which:

FIG. 1 is a plan view of a single feed shear;
FIG. 2 is an end view on line II—II of FIG. 1;
FIG. 3 is a plan view of the cutting face of the disk used in the shear of FIGS. 1 and 2;
FIG. 4 is a section on line IV—IV of FIG. 2;
FIG. 5 is a section on line V—V of FIG. 1;
FIG. 6 is a section similar to FIG. 5 including an adjustment member;
FIG. 7 is an elevation of a dual feed shear;
FIG. 8 is an end view of the shear shown in FIG. 7;
FIG. 9 is a plan view of the disk used in the shear of FIGS. 7 and 8;
FIG. 10 is a section through the shear members of the shear of FIGS. 7 and 8;
FIG. 11 is a section on line XI—XI of FIG. 10;
FIG. 12 is a perspective view of a modified material feed hopper; and
FIG. 13 is a diagrammatic view of the hopper shown in FIG. 12 in operative position with a shear.

With reference to FIGS. 1 and 2 of the drawings, the shear comprises a support frame 1, a rotary shear member 2, a material feed hopper 3 and a stationary shear member 4. Stationary shear member 4 is supported on a mounting assembly 5 attached to frame 1, and rotary shear member 2 is mounted on shaft 6 of a gear reducer 7 which is connected to an electric motor (not shown). A cantilever thrust member 8 carrying a pair of bearing mounted rollers 9 is adjustably mounted on the base member of frame 1 by screws 10 which extend through slots 11 in the bottom of the thrust member into threaded openings in the base member of the frame. A vertical plate 12 is welded to frame 1 adjacent the outer end of the thrust member and extends above the base member of the frame. Plate 12 has a pair of theaded openings formed therein, and adjusting screws 13 extend through these openings into contact with a vertical plate 14 welded to the outer end of thrust member 8. Rotation of screws 13 drives the screws into contact with plate 14 to thereby shift the thrust member toward the rotary shear member and force rollers 9 into contact with the rear surface of the rotary shear member to insure rotation in the desired plane and to maintain predetermined spacing between the rotary and stationary shear members. A guard housing 15 extends over the upper portion of the plane of rotation of the rotary shear member to prevent accidental contact therewith.

As shown in FIGS. 3–5, rotary shear member 2 consists of a disk 20 having a hub 21 formed at its center and a plurality of radial cutting blades 22 attached to the cutting face of the disk by screws 23. A keyway 24 is formed in the hub and a key carried on drive shaft 6 extends into the keyway so that rotation of the shaft rotates the disk. Spacing segments 25 are removably attached to the cutting face of disk 20 between adjacent blades by screws 26. The distance between the cutting edges of blades 22 and the exposed faces of segments 25 determines the size of the sheared material, and this distance may be varied by using segments of different thicknesses.

Stationary shear member 4 includes a mounting block 30 and a blade 31 attached to the mounting block by a plurality of screws 32. The mounting block is attached to frame member 37 by screws 33 which extend through elongated slots 34 in the block so that blade 31 may be adjusted relative to the plane of rotation of the cutting edges of the blades on the rotary shear member. Adjusting screws 35 are threaded in holes in a vertical plate 36, and the ends of the screws contact the rear surface of block 30 to move the block and preset the distance between the rotary and stationary blades.

The arrangement shown in FIG. 6 of the drawings is the same as the arrangement shown in FIG. 5 with the exception of shim 38, and like numerals have been used to designate like parts. Shim 38 is located between the bottom of mounting block 30 and the upper surface of frame member 37 and is formed with apertures for the passage of screws 33. The purpose of the shim is to raise the mounting block and thereby vary the slice angle between blade 31 and blades 22 to reduce the torque on the rotary shear member. Different shims may be used depending upon the slice angle desired which will be dictated by the material being sheared, and the slice angle will be greater with the thicker shims.

In operation, material to be sheared passes out of hopper 3 through outlet 16 at the bottom of the hopper and is picked up by blades 22 on the rotary shear member. The material is sheared as it passes between the blades on the rotary shear member and blade 31 on stationary shear member 4. The sheared material passes by gravity into a discharge chute 17 from which it may be conveyed to any location desired.

The embodiment shown in FIGS. 7–11 of the drawings is a dual feed shear in which material to be sheared is supplied to both sides of a rotating shear member and is cut by the action of blades on the rotating shear member is conjunction with stationary shear members located on opposite sides of the rotary member. As shown in FIGS. 7 and 8, the dual feed shear includes a frame 40, a material feed hopper 41, a rotary shear member 42 and a pair of stationary shear members 43 and 44. The rotary shear member is carried on a shaft 45 which is driven by an electric motor (not shown) through a standard gear reducer 46. The stationary shear members 43 and 44 are identical and like reference numerals are used to describe like parts. Material which has been sheared by the shear members passes into a discharge cuhte 47 below the shear members from which it may be conveyed to any location desired by a conveyor belt or other convenient material handling apparatus.

The rotary shear member of the dual feed shear comprises a disk 50 having a hub 51 at its center and radial blades on both sides thereof. Alternate blades 52 extend into closer proximity with hub 51 than blades 53, and the blades on opposite sides of disk 50 are staggered in the manner shown in FIG. 11 in order to provide even torque distribution as the blades shear material. A plurality of spacing segments 54 are attached to the cutting faces of the disk by screws 55 between the cutting blades to determine the size of the sheared material. The segments used on disk 50 are notched at their center, and the notch in each segment embraces a short blade 53 with a portion of the segment being located between the inner end of blade 53 and hub 51. Spacing segments 54 function in the same manner as segments 25 in the single feed shear of FIGS. 1–6. Disk 50 is mounted on shaft 45 by a key 56 in hub 51 which is forced into a keyway in the shaft by a screw 57. The use of cutting blades on each side of the disk is advantageous as the end thrust between the rotating cutting blades and the blades of the stationary shear members is equalized.

Stationary shear members 43 and 44 are shown in FIGS. 10 and 11, and each member comprises a horizontally arranged blade 60 which is attached to a mounting block 61 by a plurality of screws 62. Each mounting block is attached to a horizontal mounting member by screws 63 which pass through elongated openings 64 in the block. Adjusting screws 65 extend through threaded openings in vertical plates 66 and bear against the rear of mounting blocks 61 in order to preset the position of blades 60 in respect of the planes of rotation of the blades on the rotary shear member. Material supplied to the hopper passes through outlets 48 and 49 between blades 52 and 53 on disk 50 and stationary blades 60 and is sheared into pieces having a size determined by the thickness of spacing segments 54. Shims similar to shim 38 in FIG. 6 may be used below mounting blocks 61 if it is desired to change the slice angle.

The modification shown in FIGS. 12 and 13 of the drawings comprises a vibratory material feed hopper 70 formed with a plurality of parallel longitudinal ribs or corrugations 71 in its lower surface. The hopper is mounted on resilient members 72 so that it can be vibrated by rotation of eccentric 73 which is driven by an electric motor (not shown). This hopper is advantageous for feeding bars, rods and other elongated pieces of scrap metal to the shear as the pieces may be supplied to the hopper in a random fashion; and vibration of the hopper causes the material to fall into the valleys between corrugations 71. The material is axially aligned with the plane of rotation of the rotary shear member by the corrugations, and the ends are sheared off as the rotary shear member rotates past the stationary shear member. The vibratory hopper of FIGS. 12 and 13 may be used with a single feed shear, and a pair of vibratory hoppers may be used with a dual feed shear.

My invention has important features which make it possible to shear both metal sponge and scrap into pieces of a predetermined size with no compaction of the metal. By utilizing spacing segments on the rotary shear member, the size of the sheared metal pieces may be readily varied within the capacity of the shear. Additionally, the design of the shear makes it possible to cut a large quantity of material with a relatively low power input to the shear.

While I have shown and described preferred embodiments of my invention, it may be otherwise embodied within the scope of the appended claims.

I claim:

1. A shear having a frame, a material feed hopper, a stationary shear member and a rotary shear member; said rotary shear member including a disk mounted on a drive shaft for rotation in a vertical plane, a plurality of radially extending blades having cutting edges attached to one side of said disk to form a cutting face on said disk and spacing segments removably attached to said cutting face between adjacent blades; said stationary shear member including a mounting block located adjacent the cutting face of said disk and a stationary blade having a cutting edge attached to said mounting block, means attaching said mounting block to said frame to position the cutting edge of said stationary blade close to the plane of rotation of the cutting edges of said radially extending blades; a material outlet formed in said hopper and located above said stationary blade and adjacent the plane of rotation of said radially extending blades, whereby material to be sheared passes from said outlet into the plane of rotation of said radial blades and is carried against said stationary blade by said radial blades as said disk rotates and is sheared by the combined action of the cutting edges of said blades.

2. A shear as set forth in claim 1 wherein said means attaching the mounting block to said frame comprises a plurality of elongated slots formed in said block and a screw extending through each of said slots and threaded into a hole in said frame; and adjusting means for moving said block relative to said disk to position the cutting edge of said stationary blade relative to the plane of rotation of the cutting edges of said radially extending blades.

3. A shear as set forth in claim 1 including a thrust member adjustably mounted on said frame for movement relative to said disk and having one end located adjacent to the rear face of said disk, roller means mounted on said one end of said thrust member for contact with said rear face of said disk, a vertical plate at the other end of said thrust member, adjustment means attached to said frame adjacent said plate for contact with said plate to move said thrust member toward said rear face of said disk to force said roller means against said rear face of said disk, and means for holding said thrust member in position on said frame with said roller means contacting said rear face of said disk.

4. A shear as set forth in claim 1 wherein said feed hopper has longitudinal ribs on its bottom and is mounted on resilient members carried on said frame and an eccentric operatively connected with said hopper to vibrate said hopper on said resilient members.

5. A shear as set forth in claim 1 wherein said stationary shear member includes a shim located between said mounting block and said frame, whereby said mounting block and said stationary blade carried thereon are raised relative to said frame while maintaining the spacing between the cutting edge of said stationary blade and the cutting edges of said radially extending blades.

6. A shear as set forth in claim 1 wherein said disk has a plurality of radially extending blades having cutting edges attached to its opposite side to form a second cutting face on said disk and spacing segments attached to said second cutting face between said blades; a second stationary shear member mounted on said frame adjacent the second cutting face of said disk, said second stationary shear member including a mounting block and a stationary blade having a cutting edge attached to said block, means attaching said mounting block to said frame to position the cutting edge of said second stationary blade close to the path of rotation of the cutting edges of said radially extending blades on said second cutting face, and a second material outlet formed in said hopper and located above said second stationary blade and adjacent the plane of rotation of said radially extending blades on said second cutting face, whereby material to be sheared passes from said second outlet into the path of rotation of said radially extending blades on said second cutting face and is carried against said second stationary blade by said radially extending blades and is sheared, and the end thrust between the blades of said first and second stationary shear members and said rotary shear member is equalized.

7. A shear as set forth in claim 6 wherein the radially extending blades on opposite sides of said disk are angularly offset throughout the circumference of said disk to provide even torque distribution during shearing.

8. A shear as set forth in claim 7 wherein said means attaching said mounting blocks to said frame comprises a plurality of elongated slots formed in each of said blocks and a screw extending through each of said slots and threaded into a hole in the frame; and adjusting means for independently moving each of said blocks relative to said disk to position the cutting edges of said stationary blades relative to the planes of rotation of the cutting edges of the radially extending blades.

References Cited
UNITED STATES PATENTS

| | | | |
|---|---|---|---|
| 293,496 | 2/1884 | Nagel | 241—146 X |
| 1,932,166 | 10/1933 | Sumner | 241—92 X |
| 2,174,593 | 10/1939 | Pelot | 241—92 |
| 2,216,612 | 10/1940 | Dimm | 241—240 X |
| 2,566,938 | 9/1951 | Johnson | 241—286 X |
| 2,582,537 | 1/1952 | Flateboe | 241—245 X |
| 2,922,590 | 1/1960 | Bland | 241—92 |
| 3,144,995 | 8/1964 | Fontaine | 241—298 |

ROBERT C. RIORDON, Primary Examiner

D. G. KELLY, Assistant Examiner

U.S. Cl. X.R.
241—220, 286, 298